United States Patent
Tseng

(10) Patent No.: US 11,660,708 B2
(45) Date of Patent: May 30, 2023

(54) TIG WELDING FLUX FOR DISSIMILAR STEELS

(71) Applicant: NATIONAL PINGTUNG UNIVERSITY OF SCIENCE & TECHNOLOGY, Pingtung County (TW)

(72) Inventor: Kuang-Hung Tseng, Pingtung County (TW)

(73) Assignee: NATIONAL PINGTUNG UNIVERSITY OF SCIENCE & TECHNOLOGY, Pingtung County (TW)

( * ) Notice: Subject to any disclaimer, the term of this patent is extended or adjusted under 35 U.S.C. 154(b) by 168 days.

(21) Appl. No.: 17/382,401

(22) Filed: Jul. 22, 2021

(65) Prior Publication Data

US 2022/0184751 A1 Jun. 16, 2022

(30) Foreign Application Priority Data

Dec. 15, 2020 (TW) .................................. 109144291

(51) Int. Cl.
*B23K 35/362* (2006.01)
*B23K 35/36* (2006.01)

(52) U.S. Cl.
CPC ........ *B23K 35/3602* (2013.01); *B23K 35/362* (2013.01)

(58) Field of Classification Search
CPC .................................................... B23K 35/362
See application file for complete search history.

(56) References Cited

U.S. PATENT DOCUMENTS

| | | | | |
|---|---|---|---|---|
| 2015/0027993 A1* | 1/2015 | Bruck | ................... | B23K 35/362 148/26 |
| 2015/0034604 A1* | 2/2015 | Subramanian | .......... | B22F 10/28 219/76.12 |
| 2015/0102016 A1* | 4/2015 | Bruck | .................... | B23K 26/32 219/73.2 |
| 2015/0336219 A1* | 11/2015 | Bruck | ....................... | B22F 1/18 428/570 |
| 2016/0101433 A1* | 4/2016 | Bruck | .................... | C22C 19/07 428/668 |

FOREIGN PATENT DOCUMENTS

CN 103600167 B 11/2015

* cited by examiner

*Primary Examiner* — Jophy S. Koshy
(74) *Attorney, Agent, or Firm* — WPAT, PC

(57) ABSTRACT

A TIG welding flux for dissimilar steels is used to solve the problem that the conventional friction stir welding procedure for butt-joint welding a stainless steel workpiece and a carbon steel workpiece cannot be used on site, as well as the problem that the increased operating time and manufacturing cost due to forming bevel faces on both the stainless steel workpiece and the carbon steel workpiece. The TIG welding flux for dissimilar steels includes 25-35 wt % of silicon dioxide ($SiO_2$), 20-30 wt % of cobalt (II, III) oxide ($Co_3O_4$), 15-20 wt % of manganese (II, III) oxide ($Mn_3O_4$), 10-15 wt % of nickel (III) oxide ($Ni_2O_3$), 7-12 wt % of molybdenum trioxide ($MoO_3$), 6-11 wt % of manganese (II) carbonate ($MnCO_3$), 5-10 wt % of nickel (II) carbonate ($NiCO_3$), and 2-4 wt % of aluminum fluoride ($AlF_3$).

7 Claims, 2 Drawing Sheets

TIG WELDING FLUX FOR DISSIMILAR STEELS

CROSS REFERENCE TO RELATED APPLICATIONS

The application claims the benefit of Taiwan application serial No. 109144291, filed Dec. 15, 2020, the entire contents of which are incorporated herein by reference.

BACKGROUND OF THE INVENTION

1. Field of the Invention

The present invention generally relates to a welding flux and, more particularly, to a tungsten inert gas (TIG) welding flux for dissimilar steels.

2. Description of the Related Art

Welding of dissimilar steels is the procedure that joining two or more steel workpieces with different chemical components. Due to the significant differences of physicochemical and mechanical properties between the steel workpieces, a specialized welding procedure is needed.

As an example, China patent No. 103600167 discloses a butt-joint welding procedure for a stainless steel workpiece and a carbon steel workpiece. A side of the stainless steel workpiece and a side of the carbon steel workpiece are first milled to form bevel faces, respectively, forming a groove at the butt joint of the bevel faces of the stainless steel workpiece and the carbon steel workpiece. A filler metal of stainless steel is then filled in the groove, and the stainless steel workpiece and the carbon steel workpiece form a two jointed workpieces by a friction stir welding (FSW) procedure. However, the FSW procedure is carried out by utilizing a specialized machine, and thus cannot be carried out on site. Moreover, the bevel faces of the stainless steel workpiece and the carbon steel workpiece should be formed at first, thus increasing welding time and manufacturing costs.

In light of this, it is necessary to provide a welding flux for dissimilar steels that can be used with tungsten inert gas welding (TIG welding) procedure.

SUMMARY OF THE INVENTION

It is therefore an objective of the present invention to provide a tungsten inert gas welding (TIG welding) flux for dissimilar steels that can be used with TIG welding procedure to join two workpieces on site.

It is another objective of the present invention to provide a TIG welding flux for dissimilar steels that can be used with TIG welding to form a deep, narrow weld bead between the two jointed workpieces, and thus, formation of bevel faces of the two workpieces before the TIG welding procedure can be omitted.

One embodiment of the present invention discloses the TIG welding flux for dissimilar steels. The TIG welding flux for dissimilar steels can include 25-35 wt % of silicon dioxide ($SiO_2$), 20-30 wt % of cobalt (II, III) oxide ($Co_3O_4$), 15-20 wt % of manganese (II, III) oxide ($Mn_3O_4$), 10-15 wt % of nickel (III) oxide ($Ni_2O_3$), 7-12 wt % of molybdenum trioxide ($MoO_3$), 6-11 wt % of manganese (II) carbonate ($MnCO_3$), 5-10 wt % of nickel (II) carbonate ($NiCO_3$) and 2-4 wt % of aluminum fluoride ($AlF_3$).

Accordingly, the TIG welding flux for dissimilar steels can be used with TIG welding procedure, and thus the two workpieces can be jointed on site, improving the application flexibility of the TIG welding flux for dissimilar steels. Moreover, the TIG welding flux for dissimilar steels can be used with TIG welding procedure, forming a two jointed workpieces by a stainless steel workpiece and a carbon steel workpiece. The weld bead between the stainless steel workpiece and the carbon steel workpiece has a weld D/W ratio (weld depth/bead width ratio) more than or equal to 0.9. Therefore, for thicker workpieces (such as that with a thickness above 3 mm), the formation of bevel faces of the two workpieces can also be omitted, solving the problems such as the decrease of mechanical strength and the large heat-affected zone (HAZ). In addition, omitting the formation of the bevel faces of the two workpieces can also reduce welding time and manufacturing costs.

In preferred form shown, the TIG welding flux for dissimilar steels can include 25-28 wt % of $SiO_2$, 20-23 wt % of $Co_3O_4$, 6-8 wt % of $MnCO_3$, 5-7 wt % of $NiCO_3$, or 2-3 wt % of $AlF_3$. With such performance, the weld bead between the two jointed workpieces has a higher weld D/W ratio more than or equal to 0.9.

In preferred form shown, the TIG welding flux for dissimilar steels has a plurality of powdered particles each having a diameter of 50-90 μm. With such performance, the plurality of powdered particles can form a homogeneous mixture with great uniformity. As such, the TIG welding flux for dissimilar steels can be easily spread on the surfaces of the two workpieces. Also, the TIG welding flux for dissimilar steels can be easily melted by a heat source, and the weld depth can therefore be increased.

BRIEF DESCRIPTION OF THE DRAWINGS

The present invention will become more fully understood from the detailed description given hereinafter and the accompanying drawings which are given by way of illustration only, and thus are not limitative of the present invention, and wherein.

DETAILED DESCRIPTION OF THE INVENTION

Figure 1A:
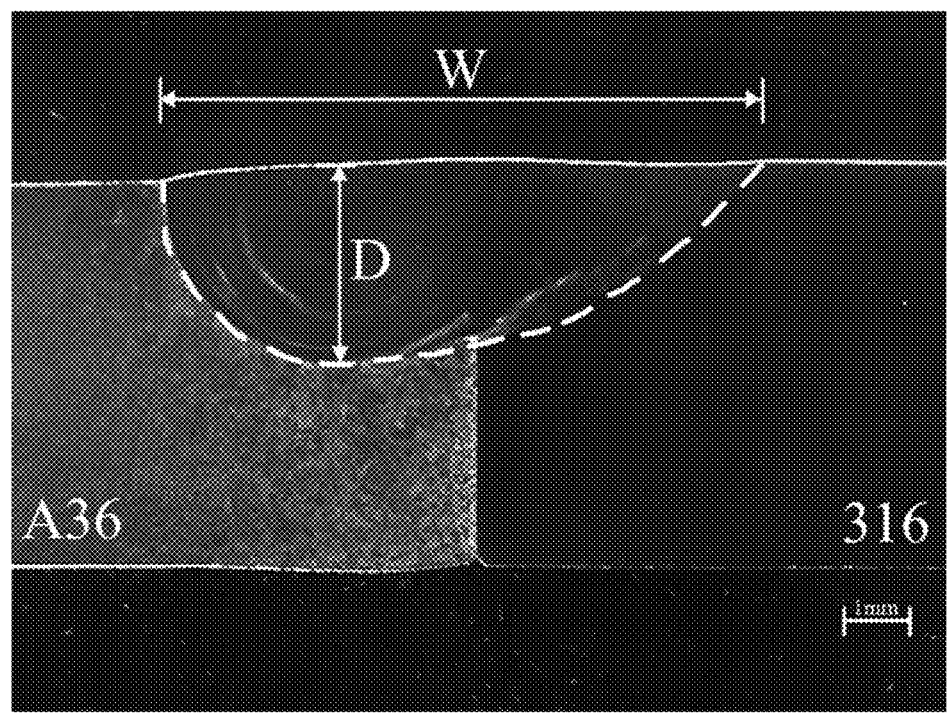
FIG. 1a depicts a cross-sectional view of two jointed workpieces of group B00 by TIG welding process without any TIG welding fluxes. The weld bead of the two jointed workpieces of group B00 is dashed circle. The weld depth "D" and the bead width "W" of the weld bead of the two jointed workpieces of group B00 are labeled.

A TIG welding flux for dissimilar steels according to a specific embodiment of the present invention that can be used with tungsten inert gas (TIG) welding procedure to join a stainless steel workpiece and a carbon steel workpiece.

Specifically, the stainless steel workpiece can be made of ASTM 316 stainless steel with chemical components shown in TABLE 1. The carbon steel workpiece can be made of ASTM A36 carbon steel with chemical components shown in TABLE 2. However, the stainless steel workpiece and the carbon steel workpiece can be made of by other known stainless steel and carbon steel, respectively, which can be appreciated by a person having ordinary skill in the art.

TABLE 1

|  | C | Si | Mn | P | S | Ni | Cr | Mo | Fe |
|---|---|---|---|---|---|---|---|---|---|
| wt % | ≤0.08 | ≤0.75 | ≤2 | ≤0.045 | ≤0.03 | 10-14 | 16-18 | 2-3 | Bal. |

TABLE 2

|  | C | Si | P | S | Cu | Fe |
|---|---|---|---|---|---|---|
| wt % | ≤0.25 | ≤0.40 | ≤0.04 | ≤0.05 | ≥0.20 | Bal. |

The TIG welding flux for dissimilar steels can include silicon dioxide ($SiO_2$), cobalt (II, III) oxide ($Co_3O_4$), manganese (II, III) oxide ($Mn_3O_4$), nickel (III) oxide ($Ni_2O_3$), molybdenum trioxide ($MoO_3$), manganese (II) carbonate ($MnCo_3$), nickel (II) carbonate ($NiCO_3$) and aluminum fluoride ($AlF_3$).

Specifically, the TIG welding flux for dissimilar steels can include 25-35 wt % of $SiO_2$, 20-30 wt % of $Co_3O_4$, 15-20 wt % of $Mn_3O_4$, 10-15 wt % of $Ni_2O_3$, 7-12 wt % of $MoO_3$, 6-11 wt % of $MnCO_3$, 5-10 wt % of $NiCO_3$ and 2-4 wt % of $AlF_3$. Preferably, the TIG welding flux for dissimilar steels can include 25-28 wt % of $SiO_2$, 20-23 wt % of $Co_3O_4$, 6-8 wt % of $MnCO_3$, 5-7 wt % of $NiCO_3$ or 2-3 wt % $AlF_3$. With such performance, when the TIG welding procedure is carried out with the TIG welding flux for dissimilar steels, the weld bead formed between the stainless steel workpiece and the carbon steel workpiece has a higher weld D/W ratio more than or equal to 0.9. Moreover, size of the HAZ formed in the stainless steel workpiece and the carbon steel workpiece are reduced, decreasing the risk of thermal deformation and residual stress of the two jointed workpieces. In addition, no arc blow occurs during the TIG welding procedure.

Besides, the TIG welding flux for dissimilar steels can have a plurality of powdered particles each having a diameter of 50-90 μm. With such performance, the plurality of powdered particles can form a homogeneous mixture with great uniformity. As such, the TIG welding flux for dissimilar steels can be easily spread on surfaces of the two workpieces. Also, the TIG welding flux for dissimilar steels can be easily melted by a heat source, and the weld depth can therefore be increased.

To validate whether the weld bead with a higher weld D/W ratio can be formed between the stainless steel workpiece and the carbon steel workpiece by the TIG welding procedure utilizing the TIG welding flux for dissimilar steels of the present invention, as well as whether arc blow occurs during the TIG welding procedure, the following trials are carried out.

Trial (A).

Powdered particles of $SiO_2$, $Co_3O_4$, $Mn_3O_4$, $Ni_2O_3$, $MoO_3$, $MnCO_3$, $NiCO_3$ and $AlF_3$ are mixed according to TABLE 3. The TIG welding fluxes of groups A01-A14 are prepared by forming paste-like slurries by dispersing the mixtures in acetone, respectively.

TABLE 3

| Group | $SiO_2$ | $Co_3O_4$ | $Mn_3O_4$ | $Ni_2O_3$ | $MoO_3$ | $MnCO_3$ | $NiCO_3$ | $AlF_3$ |
|---|---|---|---|---|---|---|---|---|
| A01 | 20 | 17 | 20 | 16 | 6 | 12 | 4 | 5 |
| A02 | 24 | 19 | 21 | 16 | 6 | 5 | 4 | 5 |
| A03 | 25 | 18 | 21 | 15 | 8 | 5 | 4 | 4 |
| A04 | 26 | 19 | 20 | 16 | 6 | 5 | 5 | 3 |
| A05 | 25 | 15 | 10 | 15 | 8 | 12 | 10 | 5 |
| A06 | 30 | 25 | 21 | 8 | 8 | 4 | 3 | 1 |
| A07 | 24 | 19 | 14 | 9 | 6 | 12 | 11 | 5 |
| A08 | 26 | 30 | 12 | 15 | 5 | 5 | 4 | 3 |
| A09 | 30 | 25 | 17 | 5 | 10 | 5 | 4 | 4 |
| A10 | 35 | 30 | 20 | 2 | 9 | 2 | 1 | 1 |
| A11 | 28 | 23 | 18 | 10 | 8 | 6 | 5 | 2 |
| A12 | 26 | 20 | 20 | 10 | 7 | 8 | 7 | 2 |
| A13 | 25 | 20 | 15 | 15 | 12 | 6 | 5 | 2 |
| A14 | 27 | 22 | 16 | 11 | 8 | 7 | 6 | 3 |

Trial (B).

In this trial, a stainless steel plate (ASTM 316) with a thickness of 6.0 mm and a carbon steel plate (ASTM A36) with a thickness of 6.0 mm are used as the stainless steel workpiece and the carbon steel workpiece, respectively. After removing contaminants attached on the surface of the stainless steel plate and the surface of the carbon steel plate using a 400-grit silicon carbide (SiC) sandpaper, the stainless steel plate and the carbon steel plate are swiped by acetone wipes. Then, the paste-like slurries formed by the TIG welding fluxes of groups A01-A14 are spread on the surface of the stainless steel plate and the surface of the carbon steel plate. The TIG welding procedure is carried out after acetone is completely evaporated, obtaining the two jointed workpieces of groups B01-B14. In addition, the two jointed workpieces of group B00 is obtained by the TIG welding procedure without any TIG welding fluxes.

In the TIG welding procedure, the welding current is set as 170 A, the welding speed is set as 73 mm/min, the flow rate of the shielding gas is set as 8 L/min, the flow rate of the purge gas is set as 6 L/min, the tungsten electrode is selected as EWLa-2 (φ 3.2 mm), the grinding angle of the tungsten electrode is set as 60°, and the contact tip-to-work distance (that is, the distance between the tip of the tungsten electrode and the surface of the stainless steel workpiece, as well as the distance between the tip of the tungsten electrode and the surface of the carbon steel workpiece) is set as 2-3 mm.

During the TIG welding procedure, the occurrence of arc blow is recorded. Moreover, after the TIG welding procedure, cross sections of the two jointed workpieces of groups B00-B14 are obtained. The weld depth "D" and the bead width "W" of the resultant weld bead are also recorded, and the weld D/W ratio of groups B00-B14 is calculated. All results are shown in TABLE 4.

TABLE 4

| Groups | Weld depth (mm) | Bead width (mm) | Weld D/W ratio | Arc blow occurs |
|---|---|---|---|---|
| B00 | 3.0 | 9.7 | 0.31 | Yes |
| B01 | 3.4 | 8.5 | 0.40 | Yes |
| B02 | 4.5 | 9.2 | 0.49 | Yes |
| B03 | 4.8 | 9.0 | 0.53 | Yes |
| B04 | 5.1 | 8.8 | 0.58 | Yes |
| B05 | 5.5 | 9.1 | 0.60 | Yes |
| B06 | 5.3 | 8.3 | 0.64 | Yes |
| B07 | 5.9 | 8.4 | 0.70 | Yes |

TABLE 4-continued

| Groups | Weld depth (mm) | Bead width (mm) | Weld D/W ratio | Arc blow occurs |
| --- | --- | --- | --- | --- |
| B08 | 5.6 | 7.3 | 0.77 | Yes |
| B09 | 6.9 | 8.3 | 0.83 | Yes |
| B10 | 7.1 | 8.2 | 0.87 | Yes |
| B11 | 7.6 | 7.7 | 0.99 | No |
| B12 | 7.4 | 8.0 | 0.93 | No |
| B13 | 7.7 | 8.1 | 0.95 | No |
| B14 | 7.5 | 7.8 | 0.96 | No |

Figure 1B:
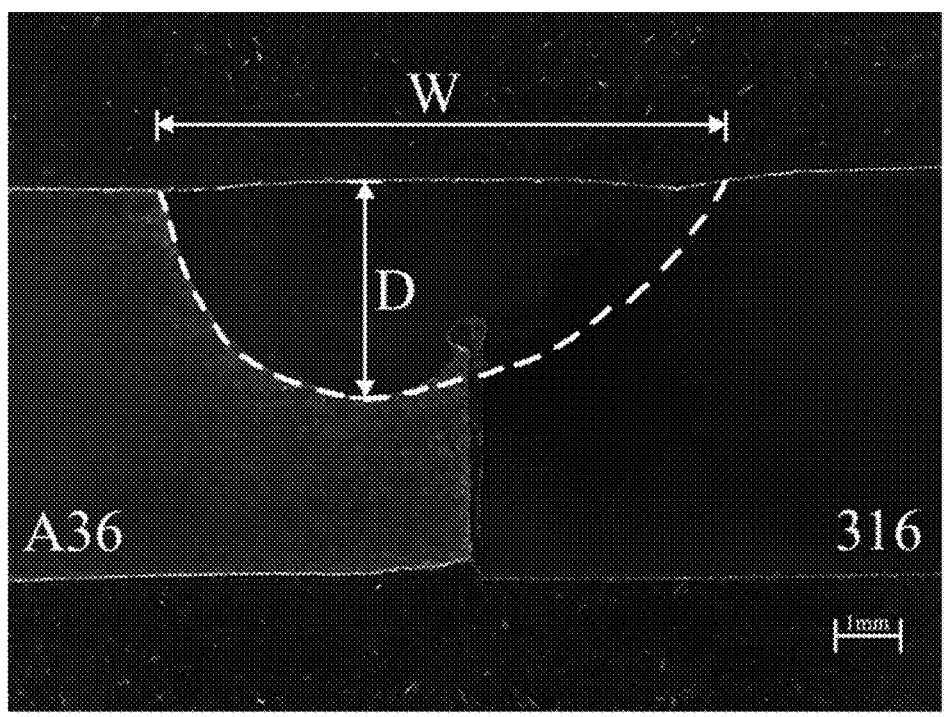
FIG. 1b depicts a cross-sectional view of two jointed workpieces of group B01 by the TIG welding process utilizing the TIG welding flux of group A01. The weld bead of the two jointed workpieces of group B01 is dashed circle. The weld depth "D" and the bead width "W" of the weld bead of the two jointed workpieces of group B01 are labeled.
Figure 1C:
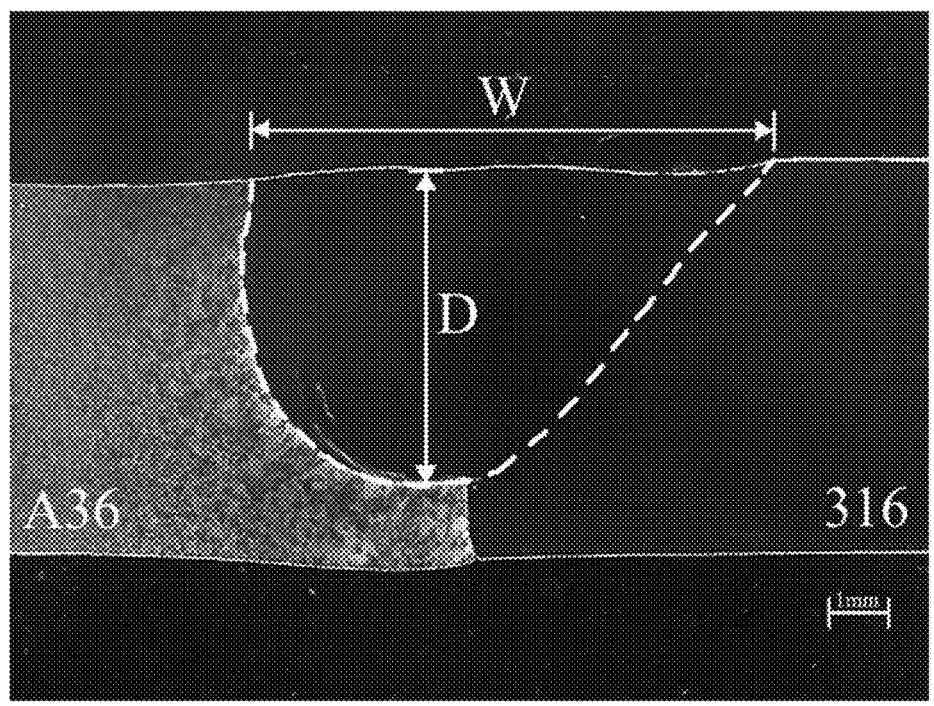
FIG. 1c depicts a cross-sectional view of two jointed workpieces of group B06 by the TIG welding process utilizing the TIG welding flux of group A06. The weld bead of the two jointed workpieces of group B06 is dashed circle. The weld depth "D" and the bead width "W" of the weld bead of the two jointed workpieces of group B06 are labeled.
Figure 1D:
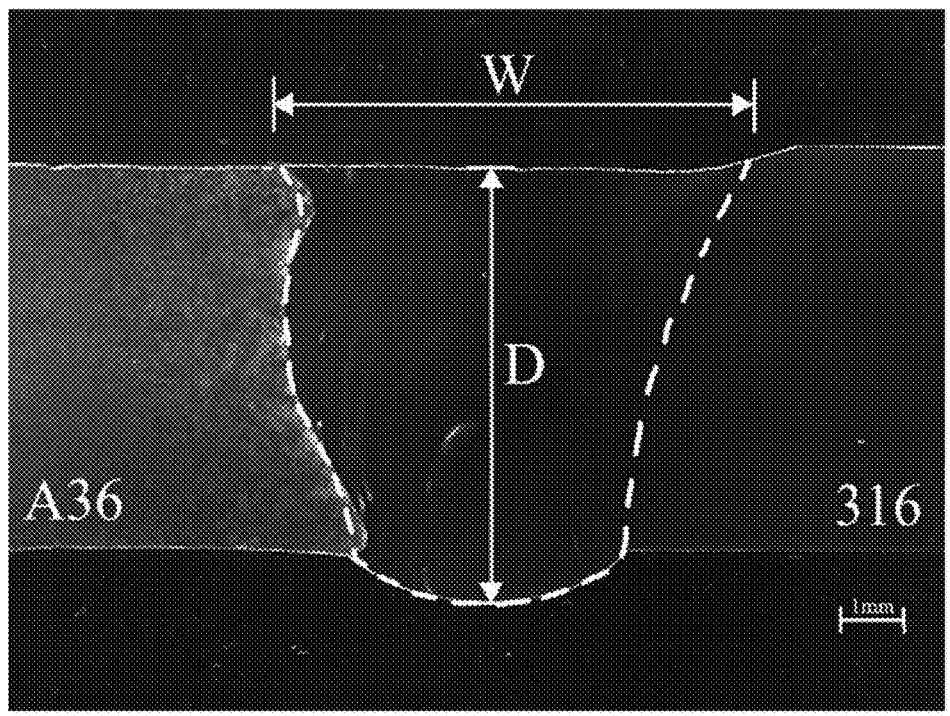
FIG. 1d depicts a cross-sectional view of two jointed workpieces of group B11 by the TIG welding process utilizing the TIG welding flux of group A11. The weld bead of the two jointed workpieces of group B11 is dashed circle. The weld depth "D" and the bead width "W" of the weld bead of the two jointed workpieces of group B11 are labeled.

FIGS. 1a-1d show the cross sections of the two jointed workpieces of groups B00, B01, B06 and B11, respectively, and only the weld bead of the two jointed workpieces of group B11 completely penetrates the two jointed workpieces. Moreover, referring to TABLE 4, compared to the weld bead of the two jointed workpieces of groups B01-B10, the weld bead of the two jointed workpieces of groups B11-B14 has an increased weld depth and a decreased bead width. The weld D/W ratio of the weld bead of the two jointed workpieces of groups B11-B14 is more than or equal to 0.9, and even up to 0.99. Thus, relative smaller HAZ can be formed, reducing the risk of problems such as thermal deformation and residual stress of the two jointed workpieces.

Besides, as shown in TABLE 4, no arc blow occurs during the TIG welding procedure utilizing the TIG welding flux of groups A11-A14.

Accordingly, the TIG welding flux for dissimilar steels of the present invention can be used with TIG welding procedure, and thus the two workpieces can be welded on site, improving the application flexibility of the TIG welding flux for dissimilar steels.

Moreover, the TIG welding flux for dissimilar steels of the present invention can be used with TIG welding procedure, forming a two jointed workpieces by a stainless steel workpiece and a carbon steel workpiece. The weld bead between the stainless steel workpiece and the carbon steel workpiece has a weld D/W ratio more than or equal to 0.9. Therefore, for thicker workpieces (such as with a thickness above 3 mm), the formation of bevel faces of the two workpieces can also be omitted. As a result, the problems such as the decrease of mechanical strength and the large HAZ, as well as the problems such as the increased welding time and manufacturing costs, are solved.

In addition, the weld bead with weld D/W ratio more than or equal to 0.9 can be formed by the use of the TIG welding flux for dissimilar steels of the present invention, and thus the HAZ formed on the stainless steel workpiece and the carbon steel workpiece are both decreased. As a result, the problems such as the decrease of mechanical strength and the large HAZ are solved. Also, no arc blow occurs during the TIG welding procedure.

Although the invention has been described in detail with reference to its presently preferable embodiment, it will be understood by one of ordinary skill in the art that various modifications can be made without departing from the spirit and the scope of the invention, as set forth in the appended claims.

What is claimed is:

1. A tungsten inert gas (TIG) welding flux for dissimilar steels, comprising: 25-35 wt % of silicon dioxide ($SiO_2$), 20-30 wt % of cobalt (II, III) oxide ($Co_3O_4$), 15-20 wt % of manganese (II, III) oxide ($Mn_3O_4$), 10-15 wt % of nickel (III) oxide ($Ni_2O_3$), 7-12 wt % of molybdenum trioxide ($MoO_3$), 6-11 wt % of manganese (II) carbonate ($MnCO_3$), 5-10 wt % of nickel (II) carbonate ($NiCO_3$) and 2-4 wt % of aluminum fluoride ($AlF_3$).

2. The TIG welding flux for dissimilar steels as claimed in claim 1, wherein the TIG welding flux for dissimilar steels comprises 25-28 wt % of $SiO_2$.

3. The TIG welding flux for dissimilar steels as claimed in claim 1, wherein the TIG welding flux for dissimilar steels comprises 20-23 wt % of $Co_3O_4$.

4. The TIG welding flux for dissimilar steels as claimed in claim 1, wherein the TIG welding flux for dissimilar steels comprises 6-8 wt % of $MnCO_3$.

5. The TIG welding flux for dissimilar steels as claimed in claim 1, wherein the TIG welding flux for dissimilar steels comprises 5-7 wt % of $NiCO_3$.

6. The TIG welding flux for dissimilar steels as claimed in claim 1, wherein the TIG welding flux for dissimilar steels comprises 2-3 wt % of $AlF_3$.

7. The TIG welding flux for dissimilar steels as claimed in claim 1, wherein the TIG welding flux for dissimilar steels comprises a plurality of powdered particles each having an average diameter of 50-90 µm.

* * * * *